(12) United States Patent
Lee

(10) Patent No.: US 11,508,057 B2
(45) Date of Patent: Nov. 22, 2022

(54) INSPECTION SYSTEM AND METHOD FOR VEHICLE UNDERBODY

(71) Applicants: Hyundai Motor Company, Seoul (KR); Kia Motors Corporation, Seoul (KR)

(72) Inventor: Kang Wook Lee, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 17/108,817

(22) Filed: Dec. 1, 2020

(65) Prior Publication Data

US 2021/0398271 A1 Dec. 23, 2021

(30) Foreign Application Priority Data

Jun. 19, 2020 (KR) .................. 10-2020-0074743

(51) Int. Cl.
*G06T 7/00* (2017.01)
*G06V 10/22* (2022.01)
*G06V 10/46* (2022.01)
*G06V 20/59* (2022.01)
*G06K 9/62* (2022.01)

(52) U.S. Cl.
CPC .......... *G06T 7/0008* (2013.01); *G06K 9/6201* (2013.01); *G06V 10/22* (2022.01); *G06V 10/462* (2022.01); *G06V 20/59* (2022.01); *G06T 2207/20081* (2013.01); *G06T 2207/20084* (2013.01); *G06T 2207/30164* (2013.01); *G06T 2207/30268* (2013.01); *G06V 2201/08* (2022.01)

(58) Field of Classification Search
CPC ......... G06T 7/0008; G06T 2207/20081; G06T 2207/20084; G06T 2207/30164; G06T 2207/30268; G06K 9/6201; G06V 10/22; G06V 10/462; G06V 20/59; G06V 2201/08

See application file for complete search history.

(56) References Cited

U.S. PATENT DOCUMENTS

| 6,052,631 | A | * | 4/2000 | Busch ................ B60R 16/0234 |
| | | | | 701/29.1 |
| 10,497,108 | B1 | * | 12/2019 | Knuffman ............. G06T 7/0008 |
| 2003/0185340 | A1 | * | 10/2003 | Frantz ................ G01N 21/8806 |
| | | | | 378/57 |

(Continued)

*Primary Examiner* — Ming Y Hon
(74) *Attorney, Agent, or Firm* — Fox Rothschild LLP

(57) ABSTRACT

An inspection system for a vehicle underbody in an in-line process includes: a vehicle recognition unit for acquiring a vehicle ID by recognizing a vehicle entering an inspection process; a vision system that photographs the vehicle underbody through a plurality of cameras disposed under a vehicle moving direction (Y-axis) and disposed at vertical and diagonal angles along a width direction (X-axis) of the vehicle; and an inspection server that detects assembly defects of a component by performing at least one of a first vision inspection that matches an object image for each component through a rule-based algorithm or a secondary deep-learning inspection through a deep-learning engine by acquiring a vehicle underbody image photographed by operating the vision system with setting information suitable for a vehicle type and a specification according to the vehicle ID.

20 Claims, 11 Drawing Sheets

(56) References Cited

U.S. PATENT DOCUMENTS

| | | | | |
|---|---|---|---|---|
| 2005/0058242 | A1* | 3/2005 | Peschmann | G01R 27/06 378/57 |
| 2007/0009136 | A1* | 1/2007 | Pawlenko | G06V 10/255 382/104 |
| 2007/0046237 | A1* | 3/2007 | Lakshmanan | G05B 15/02 318/568.11 |
| 2008/0211914 | A1* | 9/2008 | Herrera | H04N 7/18 348/148 |
| 2009/0073388 | A1* | 3/2009 | Dumm | H04N 5/23299 352/243 |
| 2014/0236514 | A1* | 8/2014 | Icove | G01V 3/15 702/65 |
| 2016/0090132 | A1* | 3/2016 | Ramsey | H04N 5/2251 180/65.1 |
| 2018/0137614 | A1* | 5/2018 | Prabhu | G06T 7/001 |
| 2018/0197042 | A1* | 7/2018 | Porter | G06V 10/751 |
| 2020/0322546 | A1* | 10/2020 | Carolus | H04N 5/2254 |
| 2020/0410657 | A1* | 12/2020 | Horii | G06N 3/0454 |
| 2021/0201467 | A1* | 7/2021 | So | G05B 19/41815 |
| 2021/0404799 | A1* | 12/2021 | Ostervold | G01B 7/06 |

* cited by examiner

FIG. 3
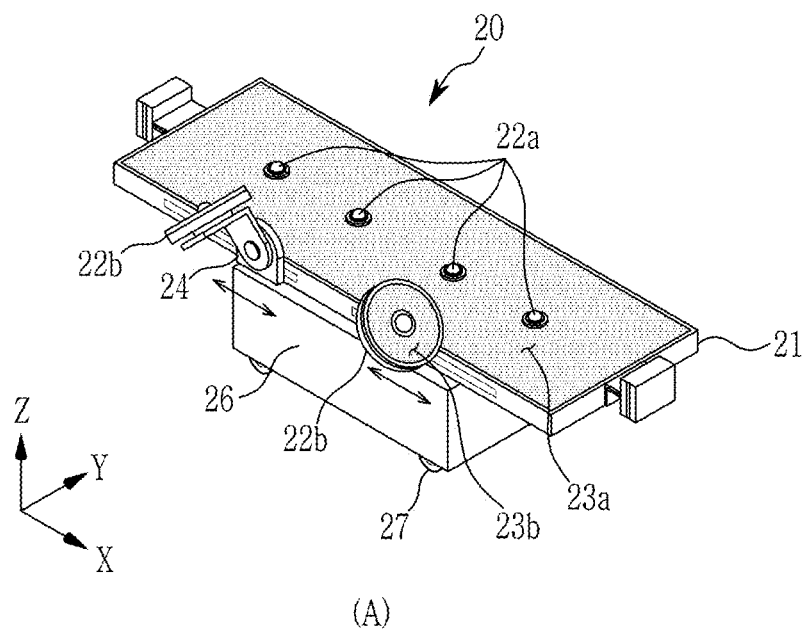
(A)
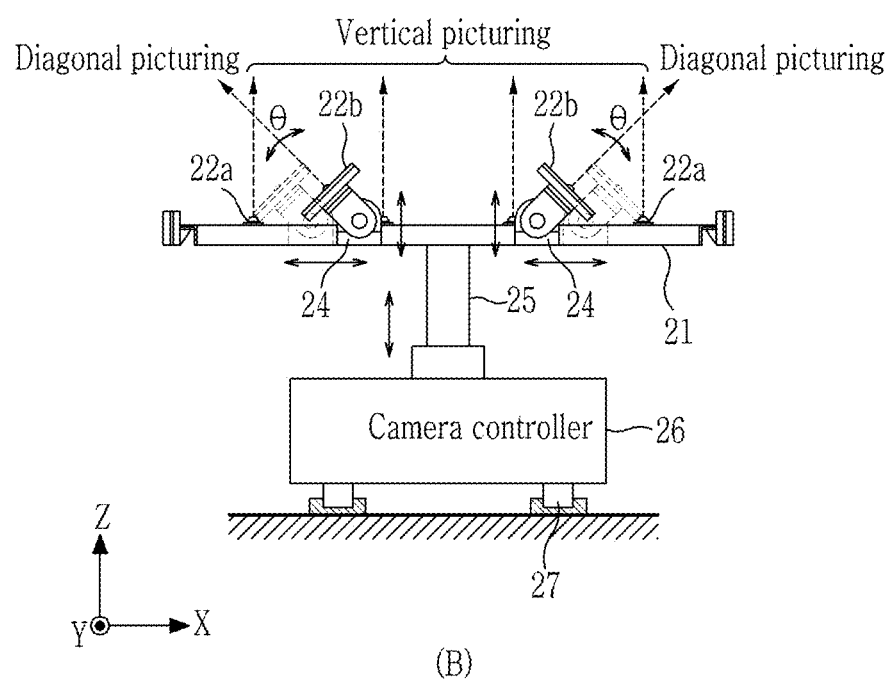
(B)

FIG. 4

| No. | Component | Item | Comments |
|---|---|---|---|
| 1 | Undercover | Bolt nut fastener grommet | |
| 2 | Mission assembly | Bolt nut | |
| 3 | Roll rod | Bolt, fixing bracket | |
| 4 | Muffler | Nut Muffler hanger engage | |
| 5 | Lower arm | Bolt nut | |
| 6 | Fuel hose | Hose insertion state, clip position | |
| 7 | Heater protector | Mounting nut stud | |
| 8 | Rigidity bolt | Bolt mounting | |
| 9 | Parking cable | Nut bracket | |
| 10 | Mud card | Specification different type mounting | |
| ... | ... | ... | |
| Total | 26 | 130 items | |

INSPECTION SYSTEM AND METHOD FOR VEHICLE UNDERBODY

CROSS-REFERENCE TO RELATED APPLICATION

This application claims under 35 U.S.C. § 119 the benefit of Korean Patent Application No. 10-2020-0074743 filed in the Korean Intellectual Property Office on Jun. 19, 2020, the entire contents of which are incorporated herein by reference.

BACKGROUND

(a) Technical Field

The present disclosure relates to an inspection system for a vehicle underbody and an inspection method for the vehicle underbody, more particularly, to the inspection system and method for automatically inspecting an underbody of a vehicle assembled in a factory.

(b) Description of the Related Art

In general, a vehicle is assembled in a factory through several process lines, and an assembled state of the vehicle is inspected at a completion stage.

For example, when an assembled vehicle enters a vehicle underbody inspection process, the assembled state of the components of the underbody of the vehicle is inspected through an upward-looking movement of a worker positioned inside a pit by the naked eye. In addition, the worker prepares an inspection result sheet manually after the inspection is finished.

However, the conventional inspection method of the vehicle underbody requires a continuous and repeated upward-looking movement in the pit provided under the vehicle, and thus musculoskeletal disorders may occur in the neck and shoulders of the worker.

In addition, there is a problem that fatigue due to the upward-looking movement of the worker is increased, and quality deterioration and customer dissatisfaction due to a post-process outflow and distribution of defective vehicles may be increased due to occurrence of human errors resulting from the conventional inspection method.

In addition, when a problem occurs in the future by relying on the inspection result sheet prepared by the worker, it is difficult to check the exact cause except by the worker who directly inspected the vehicle.

The above information disclosed in this Background section is only for enhancement of understanding of the background of the disclosure, and therefore it may contain information that does not form the prior art that is already known in this country to a person of ordinary skill in the art.

SUMMARY

An exemplary embodiment of the present disclosure provides an inspection system for a vehicle underbody and an inspection method that automatically detect assembly defects of components by acquiring vehicle underbody images by using a vision system of various photographing angles and analyzing images based on deep learning.

According to an exemplary embodiment of the present disclosure, an inspection system for a vehicle underbody in an in-line process includes: a vehicle recognition unit for acquiring a vehicle ID by recognizing a vehicle entering an inspection process; a vision system that photographs the vehicle underbody through a plurality of cameras disposed under a vehicle moving direction (Y-axis) and disposed at vertical and diagonal angles along a width direction (X-axis) of the vehicle; and an inspection server that detects assembly defects of a component by performing at least one of a first vision inspection that matches an object image for each component through a rule-based algorithm or a secondary deep-learning inspection through a deep-learning engine by acquiring a vehicle underbody image photographed by operating the vision system with setting information suitable for a vehicle type and a specification according to the vehicle ID.

The vision system may include a plurality of vertical cameras arranged at a constant interval along a width direction on the upper surface of the base and photographing a horizontal assembly part of the vehicle underbody; tilting cameras set on a base in diagonal directions on both sides to obtain wheel housing part images inside a tire; and a camera controller photographing an entire region of the underbody (e.g., of the moving vehicle) by driving a plurality of vertical cameras and the tilting cameras according to an operation instruction of an inspection server and transmitting the photographed vehicle underbody to the inspection server.

The plurality of cameras may be applied as an area scan camera type for correction of an inspection cycle time and an inspection position for each frame.

The plurality of cameras may be applied as a global shutter type to photograph the vehicle underbody (e.g., of the moving vehicle).

The vision system may include an LED plate light configured on an upper surface of the base and an LED ring light configured on an installation surface of each of the tilting cameras, and each light filters a diffuse reflection through a polarizing filter.

The vision system may adjust a tilting angle (θ) of each of the tilting cameras through a tilting camera mounting unit that includes at least one servo motor and changes setting positions in up/down and left/right directions.

The vision system may further include a vertical elevator for vertically changing the position of the base on which the plurality of cameras are disposed.

The vision system may be installed so as to move back and forth according to an equipment environment through a front and rear moving device of a linear motion (LM) guide type installed at the lower part.

The inspection server may include: a communication unit including at least one wire/wireless communication device for communication with the vehicle recognition unit and the vision system; an image processing unit distinguishing and storing the vehicle underbody image captured at the same time point for each ID of the vertical camera and each of the tilting cameras; a database (DB) storing various programs and data for the vehicle underbody inspection and storing DB-formed data by matching the inspection result data by each vehicle ID with a corresponding image; and a controller analyzing the vehicle underbody image to detect an assembly state and a defect of the component, but omitting secondary deep-learning inspection for the vehicles in which a first vision inspection result is normal and performing the secondary deep-learning inspection only for vehicles with a poor first vision inspection result.

The image processing unit may generate a single vehicle underbody image by matching the images captured by a plurality of cameras ID, adjust noise and brightness through pre-processing work of the vehicle underbody image, and remove a background to extract a region of interest (ROI) for each component.

The controller may perform ROI correction according to the vehicle position for the vehicle underbody image, recognize an object image for each component in the vehicle underbody image (i.e., the entire image), and perform position correction of the ROI with an object image unit.

The controller may convert the object image to a grayscale, compare an area feature value for each angle through template matching, extract a matching score according to the comparison, and determine that it is defective if the matching score is less than a predetermined reference value.

The controller may divide the ROI into a plurality of regions defined according to a characteristic of the component, distinguish the divided regions with a label, and compare a label ratio of each region divided by the label with a reference ratio to determine whether the component is defective in the assembly.

The controller may compare label ratios in the region divided by the label with each other to determine whether the component is defective in the assembly from a ratio that changes when any one label ratio is omitted.

The deep-learning engine may analyze the image by using convolutional neural networks (CNN) only for the image that is defective as the first vision inspection result, and perform learning after labeling the normal component and the defective component.

The deep-learning engine may determine whether or not there is a defective component in the analyzed image, and determine whether an image with a background similar to the normal component is defective.

On the other hand, according to an aspect of the present disclosure, an inspection method of a vehicle underbody as a method in which an inspection system for a vehicle underbody in an in-line process inspects an underbody of a vehicle entering an inspection process includes: a) obtaining a vehicle ID through a barcode or a wireless communication antenna of a vehicle entering an inspection process; b) photographing a vehicle underbody by driving a vision system disposed under a vehicle moving direction (Y-axis) and in which a plurality of cameras are disposed at vertical and diagonal angles along a width direction (X-axis) of the vehicle; c) performing a first vision inspection of an object image for each component through a rule-based algorithm by obtaining the vehicle underbody image; and d) omitting a secondary deep-learning inspection for the vehicle in which the first vision inspection result is normal and performing secondary deep-learning inspection for determining whether the component is defective through a deep-learning engine only for a vehicle in which the first vision inspection result shows a defect.

The performing of the first vision inspection may include: performing a region of interest (ROI) correction according to a vehicle position for a vehicle underbody image and performing object image recognition for each component in the vehicle underbody image (i.e., the entire image) and a position correction of the ROI with an object image unit; converting the object image to a grayscale, comparing an area feature value for each angle through template matching, and extracting a matching score according to the comparison to determine a defect if the matching score is less than a predetermined reference value; dividing the ROI into a plurality of regions defined according to a characteristic of a component, distinguishing the divided regions by a label and comparing a label ratio of each region divided by the label with a reference ratio, resulting in a defective assembly of the component; and comparing each label ratio in the region divided by the label with each other and determining whether or not the component is defective in the assembly from the ratio that is changed when one label ratio is omitted.

The performing of the deep-learning inspection may include: analyzing an image using convolutional neural networks (CNN) only for an image in which the first vision inspection result is a defect; and determining whether the component is defective according to the presence or absence of the component in the analyzed image and determining the image with a background similar to that of the normal component as defective.

After the step d), displaying the result determined as the final defect on a screen and sending an alarm to a worker and storing inspection result data including a vehicle ID and a defect occurrence position, a component item, an inspection time, and an object image to a DB may be further included.

According to an exemplary embodiment of the present disclosure, there is an effect that musculoskeletal diseases and human errors according to the conventional worker naked eye inspection may be prevented by inspecting the underbody of the vehicle through the vision system of various photographing angles.

In addition, by determining whether the defects are generated based on objective and quantitative data based on the accurate setting of the vision system suitable for the various vehicle types/specifications and the deep learning data, there is an effect of improving the reliability of the inspection and reducing a claim cost of the field.

In addition, it is possible to predict the assembly problem at the time by storing the image-based underbody inspection result of the vehicle into a database, and it may be expected to improve assembly quality and a production number in the factory by using it as a basis for correcting the assembly defect cause and the assembly defect process in a process with frequent defect occurrence.

BRIEF DESCRIPTION OF THE DRAWINGS

FIG. 3 is a view schematically showing a configuration of a vision system according to an exemplary embodiment of the present disclosure.

FIG. 4 is a view showing a list of an inspection component of an underbody of a vehicle according to an exemplary embodiment of the present disclosure.

DETAILED DESCRIPTION OF THE EMBODIMENTS

Figure 1:
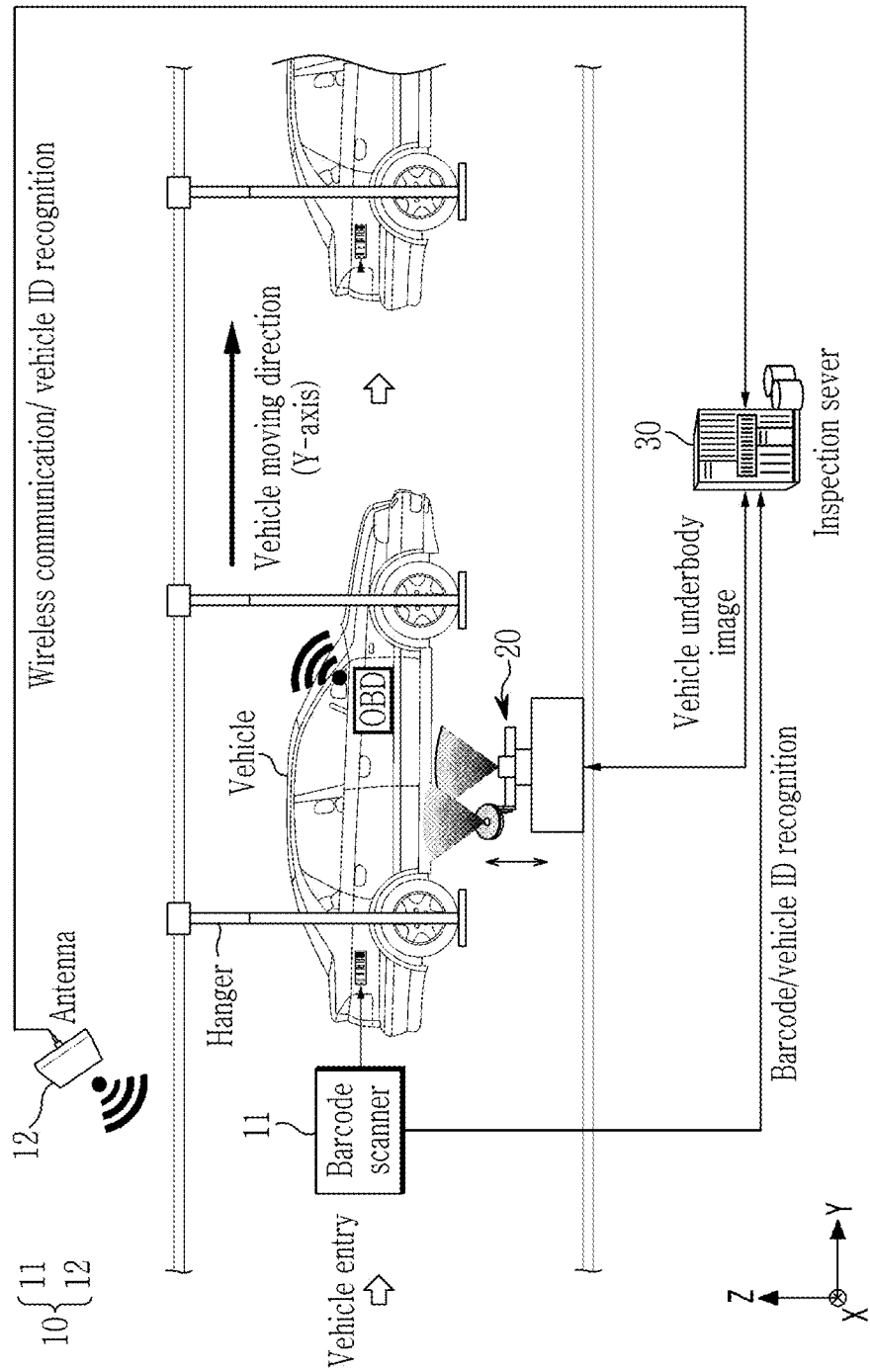
FIG. 1 and FIG. 2 are views showing a configuration of an inspection system for a vehicle underbody viewed from a side (an X-axis) and a front (a Y-axis) according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, terms such as first, second, "A", "B", "(a)", "(b)", and the like will be used only to describe various elements, and are not to be interpreted as limiting these elements. These terms are only for distinguishing the constituent elements from other constituent elements, and nature or order of the constituent elements is not limited by the terms.

In this specification, it is to be understood that when one component is referred to as being "connected" or "coupled" to another component, it may be connected or coupled directly to the other component or may be connected or coupled to the other component with a further component intervening therebetween. In this specification, it is to be understood that when one component is referred to as being "connected or coupled directly" to another component, it may be connected or coupled to the other component without another component intervening therebetween.

Now, an inspection system for a vehicle underbody and an inspection method according to an exemplary embodiment of the present disclosure are described with reference to accompanying drawings.

Figure 2:
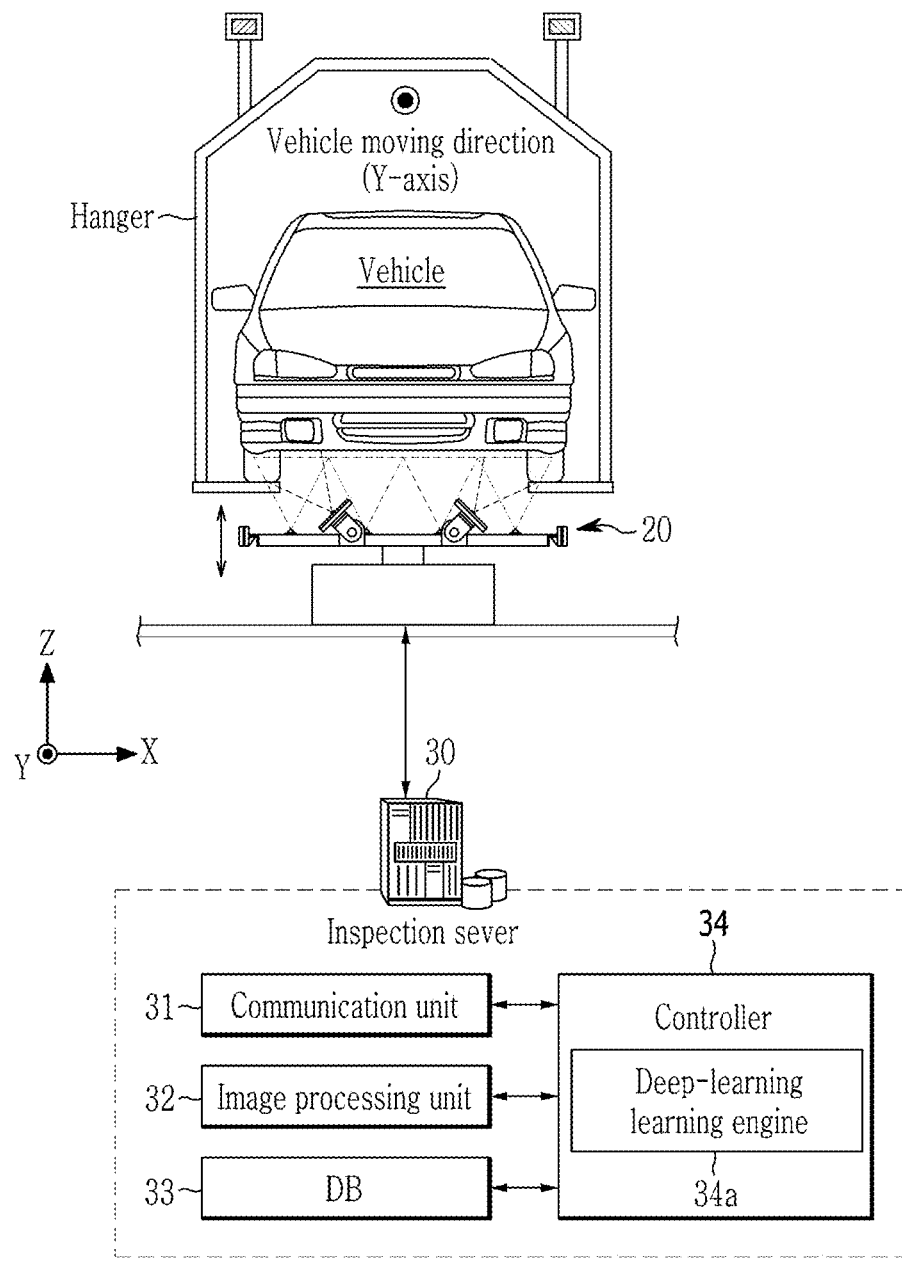

FIG. 1 and FIG. 2 are views showing a configuration of an inspection system for a vehicle underbody as viewed from a side (an X-axis) and a front (a Y-axis) according to an exemplary embodiment of the present disclosure.

Referring to FIG. 1 and FIG. 2, an inspection system for a vehicle underbody according to an exemplary embodiment of the present disclosure includes a vehicle recognition unit 10, a vision system 20, and an inspection server 30.

The vehicle recognition unit 10 recognizes that a vehicle mounted on a hanger (e.g., a conveyor), which is an inline process moving device, enters a vehicle inspection process.

The vehicle recognition unit 10 may be implemented with at least one of a barcode scanner 11 and a wireless communication antenna 12.

The barcode scanner 11 recognizes the barcode attached to the vehicle and transmits an ID (e.g., a VIN: vehicle identification number) of the entered vehicle to the inspection server 30. The barcode scanner 11 may be an automatic scanner fixed to an attachment position of the barcode or a manual scanner used by a worker.

The wireless communication antenna 12 may be a directional antenna, and transmits the vehicle ID (e.g., a VIN) received through wireless communication to the inspection server 30 by recognizing the vehicle entry according to the access of the wireless OBD mounted on the vehicle entering the vehicle inspection process. In addition, the vehicle recognition unit 10 may further include a vehicle detecting sensor (not shown) that detects whether the vehicle enters through an ultrasonic wave or a laser signal and detects a hanger that is not mounted with the vehicle.

The vision system 20 is disposed at the lower part of a vehicle moving direction (the Y-axis) and photographs a vehicle underbody through a plurality of cameras 22a and 22b disposed at various angles according to the width direction (the X-axis) of the vehicle.

For the cameras 22a and 22b, a camera of an area scan type may be applied to correct an inspection cycle time and an inspection position for each frame. In addition, the cameras 22a and 22b may apply a global shutter method of a fast frame speed and high-resolution to photograph the underbody of the vehicle moving at a fast speed.

FIG. 3 is a view schematically showing a configuration of a vision system according to an exemplary embodiment of the present disclosure.

Referring to FIG. 3, according to an exemplary embodiment of the present disclosure, the vision system 20 has four vertical cameras 22a arranged with a constant interval along the width direction (the X-axis) on the upper surface of the base 21, and two tilting cameras 22b tilted in a predetermined direction (e.g., in a direction tilted upward by a predetermined angle from the bottom of the base) on the side surface of the base 21. Here, four vertical cameras 22a acquire images of the horizontal assembly part of the underbody of the vehicle, and the two tilting cameras 22b capture images of the wheel housing part inside the tire positioned in the diagonal direction, respectively.

In addition, the vision system 20 includes an LED plate light 23a provided on the upper surface of the base 21 and an LED ring light 23b provided on the installation surface of the tilting camera 22b. The LED plate light 23a and the LED ring light 23b may suppress a diffuse reflection in a direct light method by increasing the light size compared to the inspection target and minimize the diffuse reflection through a polarization filter.

The vision system 20 photographs the entire area of the underbody of the vehicle using four vertical cameras 22a and two tilting cameras 22b. At this time, the vision system 20 secures a photographable area of about 400 mm or more compared to an actual vehicle in order to cope with various changes such as a vehicle type, a specification, an assembly distribution, and a hanger seating state.

The vision system 20 may adjust a tilting angle (θ) of the tilting camera 22b through a tilting camera mounting unit 24, which includes at least one servo motor, and adjust the up/down and left/right setting positions.

In addition, the vision system 20 may vertically adjust the position of the base 21 on which a plurality of cameras 22a and 22b are disposed through a vertical elevator 25.

A camera controller 26 controls the overall operation of the vision system 20, and includes at least one microcontroller unit (MCU), hardware, software, memory, and communication device inside the housing for this purpose.

The camera controller 26 drives the vision system 20 according to the operation instruction of the inspection server 30 to photograph the entire area of the underbody of the vehicle, and transmits the captured vehicle underbody image to the inspection server 30.

The vision system 20 may be installed to be movable along the moving direction (the Y-axis direction) of the vehicle according to the equipment environment by further including a front and rear moving device 27 of an LM (Linear Motion) guide type installed under the camera controller 26.

The vision system 20 is not limited to the number of the cameras and lights above, but may be changed according to the inspection condition/environment of the vehicle.

Referring to FIG. 2, the inspection server 30 according to an exemplary embodiment of the present disclosure includes a communication unit 31, an image processing unit 32, a database (DB) 33, and a controller 34.

The communication unit 31 includes at least one wire/wireless communication device for communication with the vehicle recognition unit 10 and the vision system 20.

When the vehicle entry is recognized, the controller 34 transmits the operation instruction to the vision system 20 through the communication unit 31 and receives the vehicle underbody image captured by the vision system 20.

The image processing unit 32 divides the vehicle underbody image captured at the same time point for each ID of the vertical cameras 22a and the tilting cameras 22b of the vision system 20 and stores them in the database 33.

The image processing unit 32 generates a single vehicle underbody image by matching the images captured for each ID of a plurality of vertical cameras 22a and tilting cameras 22b.

The image processing unit 32 adjusts the noise included in the image and the brightness of the image through pre-processing work of the vehicle underbody image, and removes the background to extract a region of interest (ROI) for each component.

FIG. 4 is a view showing a list of inspection components of an underbody of a vehicle according to an exemplary embodiment of the present disclosure.

Referring to FIG. 4, the underbody of the vehicle includes various components such as an undercover, a mission assembly, a roll rod, a muffler fastener, and a tie-rod as major inspection components of the vehicle, which may be changed according to the vehicle type and specification. Inspection types include whether vehicle underbody components are mounted, whether they are engaged, different specifications, component spacing, damage, and leakage.

The DB 33 stores various programs and data for the vehicle underbody inspection according to an exemplary embodiment of the present disclosure, and generates a database by matching the inspection result data for each vehicle ID to the corresponding image. That is, the DB 33 secures quality management according to statistics by storing a defect occurrence position, a defect occurrence type, a defect occurrence time, a defect occurrence process, and the like of the component of the underbody of the vehicle based on the inspection result data, and may be used as a basis for an assembly defect cause and an assembly defect process correction based on this.

The controller 34 controls the overall operation of the inspection system for the vehicle underbody that automatically detects the assembly state and the defect occurrences of the component by analyzing the vehicle underbody image acquired using the vision system 20 according to an exemplary embodiment of the present disclosure.

For this purpose, the controller 34 may be implemented as at least one processor operated by a predetermined program, and the predetermined program may be programmed to perform each step of the inspection method of the vehicle underbody according to an exemplary embodiment of the present disclosure.

The inspection method of the vehicle underbody is described with reference to the drawing below, but features of the controller 34 are specified through this.

Figure 5:
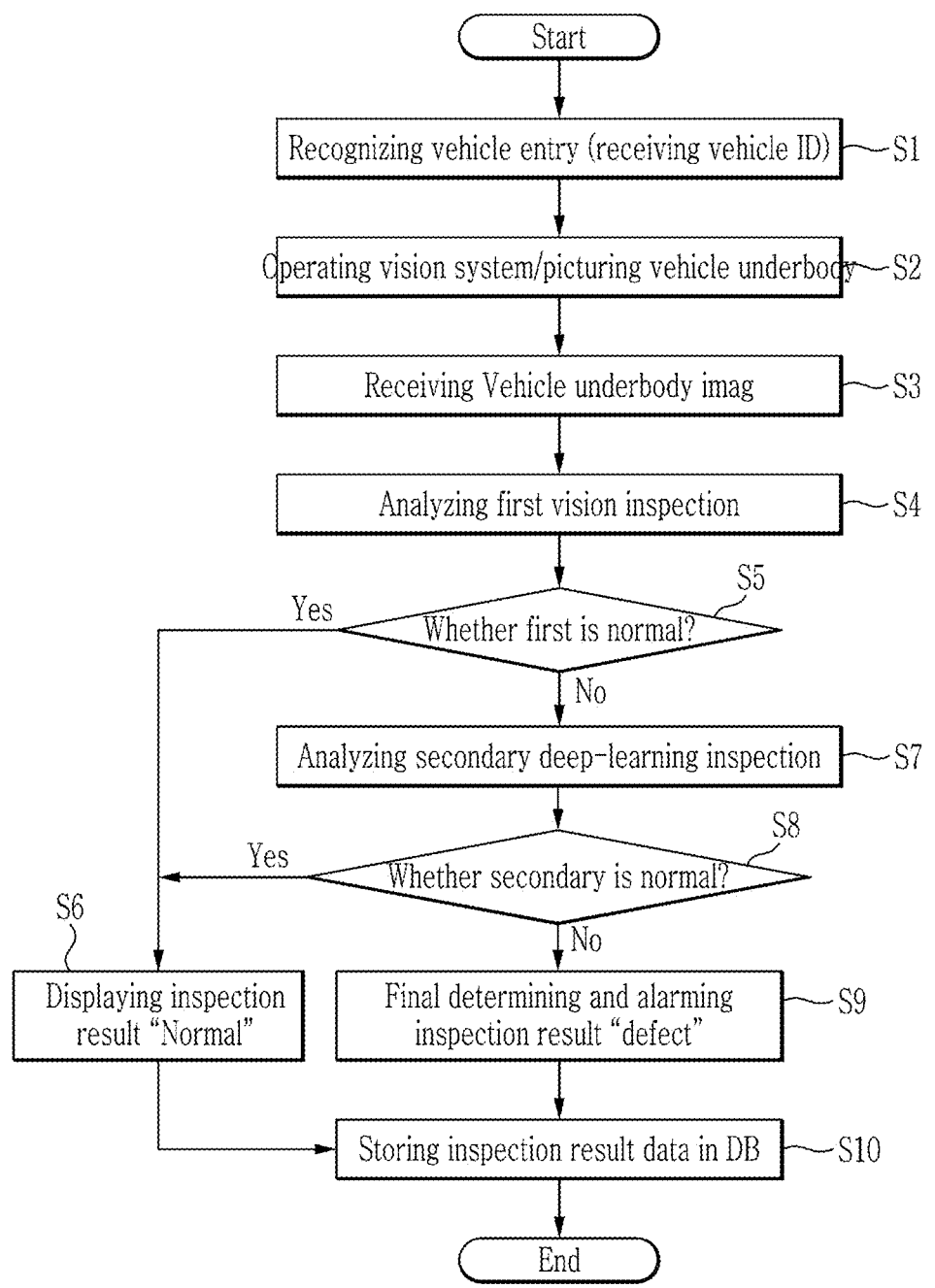
FIG. 5 is a flowchart schematically showing an inspection method of a vehicle underbody according to an exemplary embodiment of the present disclosure.

FIG. 5 is a flowchart schematically showing an inspection method of a vehicle underbody according to an exemplary embodiment of the present disclosure.

Figure 6:
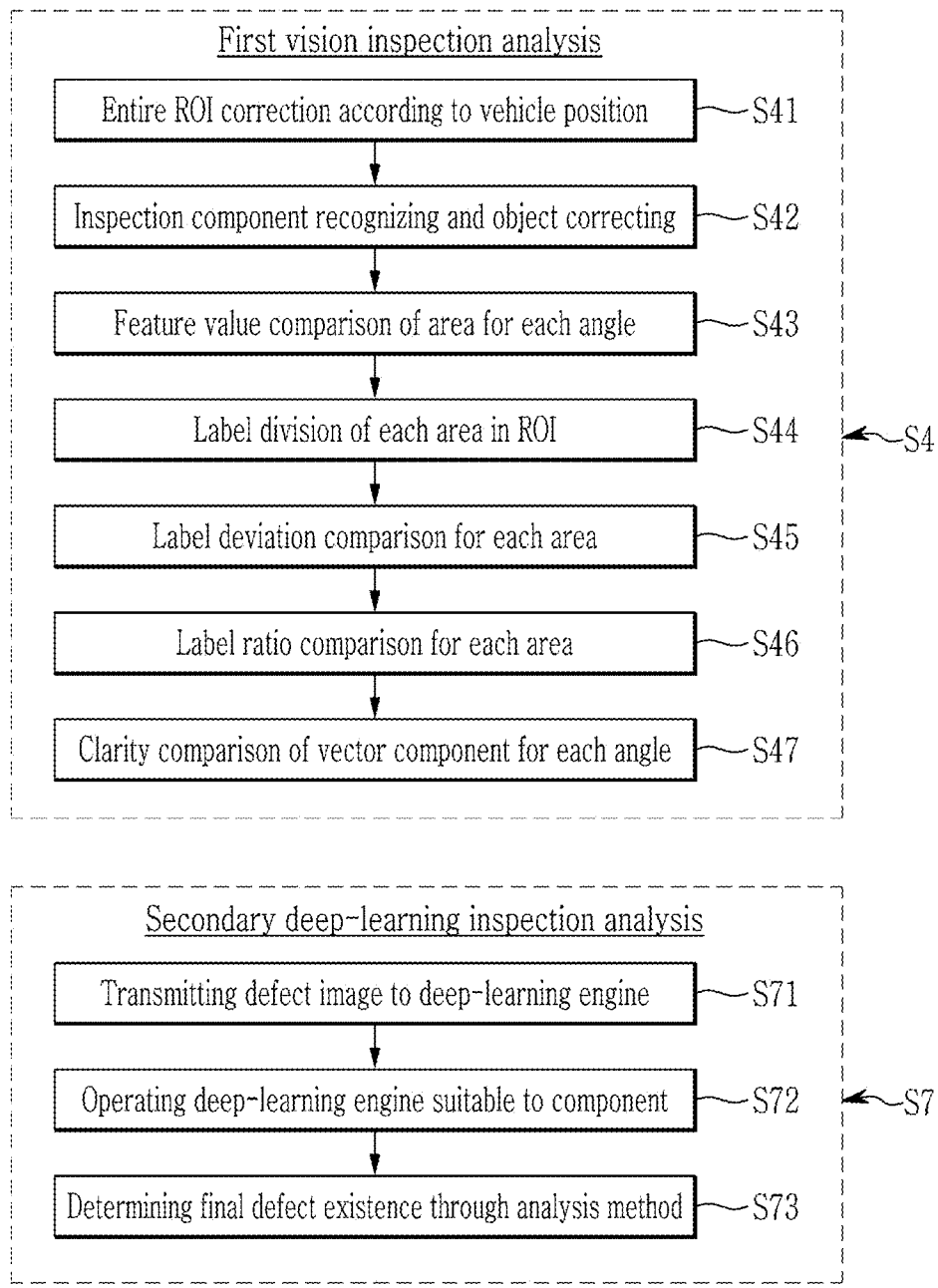
FIG. 6 is a view showing first and second inspection processes of an inspection method of a vehicle underbody according to an exemplary embodiment of the present disclosure in detail.

FIG. 6 is a view showing a first and second inspection process of an inspection method of a vehicle underbody according to an exemplary embodiment of the present disclosure in detail.

Figure 7:
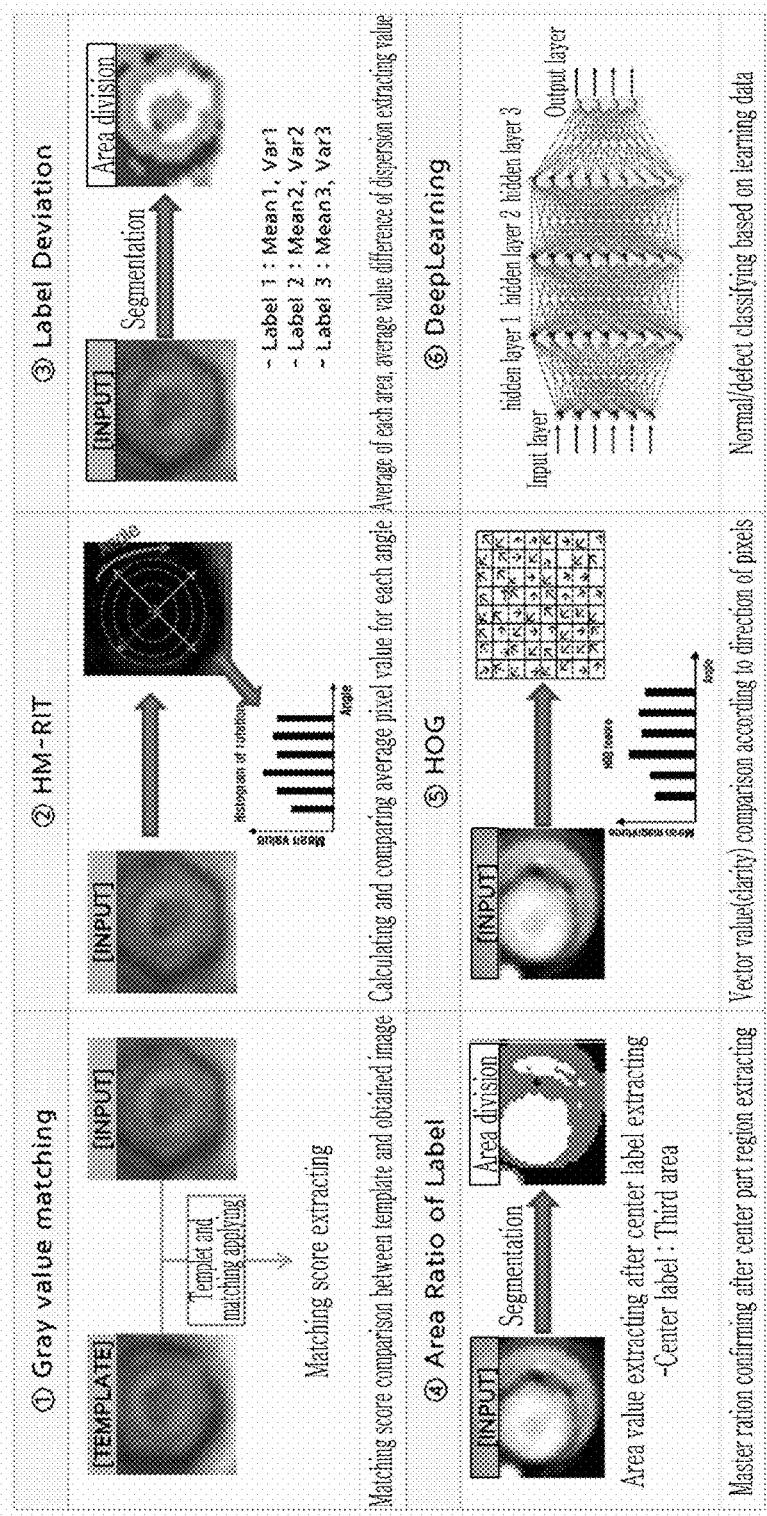
FIG. 7 is a view showing an operation mechanism of first and second inspection processes according to an exemplary embodiment of the present disclosure.

FIG. 7 is a view showing an operation mechanism of first and second inspection processes according to an exemplary embodiment of the present disclosure.

First, referring to FIG. 5, the controller 34 of the inspection server 30 according to an exemplary embodiment of the disclosure present receives the vehicle ID from the vehicle recognition unit 10 to recognize the entry of the vehicle (S1).

The controller 34 photographs the underbody of the vehicle by operating the vision system 20 based on setting information corresponding to the vehicle ID (S2). At this time, the controller 34 may query the vehicle type and specification matched with the vehicle ID from a production information system (MES) or the DB 33, and apply an operation instruction so as to set the vision system 20 with setting values of the camera and the light corresponding thereto.

The controller 34 receives the vehicle underbody image photographed according to the operation of the vision system 20 (S3). In this case, the controller 34 may perform pre-processing work of the vehicle underbody image through the image processing unit 32 and extract the ROI for each component.

As a first step, the controller 34 performs a first vision inspection analysis, which analyzes the image acquired through the image processing unit 32, through a rule-based algorithm (S5).

The first vision inspection analysis process is described in detail with reference to FIG. 6 and FIG. 7.

The controller 34 performs the entire ROI correction according to the vehicle position for the vehicle underbody image (S41). At this time, the controller 34 may perform the ROI correction according to the vehicle position by using the entire image as a frame unit.

When assembling the vehicle, since paint of an engagement component such as a bolt may be peeled off or a production deviation or an assembly deviation may occur for each component, the controller 34 may extract an object image for each component from the entire image and perform the position correction of the ROI as an object image unit (S42).

The controller 34 converts the object image into a grayscale and compares feature values of a predetermined area for each angle through template matching of the object image converted into the grayscale and a predetermined template (S43). That is, the controller 34 may compare the features of the predetermined area for each angle of the object image (e.g., a predetermined area for each 20 degrees) of the object image and the predetermined area for each angle of the template. At this time, the controller 34 may extract the matching score according to the above-comparison and determine that the matching is defective if the matching score is less than a predetermined reference value.

The controller 34 may perform histogram matching by generating a histogram for a direction of edge pixels in each divided region of a reference object image as a template in advance. This histogram matching method is suitable for identification of an object or vehicle component whose internal pattern is not complicated while outer contour information of the object image has unique information. However, the components such as the bolts have a polygonal (square, hexagonal, etc.) shape of the head and are rotated when being engaged, so in case of the template matching, the inspection rate may be affected. Therefore, the controller 34 may compare the matching rate with the template by calculating an average pixel of the predetermined area for each angle of the object image.

The controller 34 divides the ROI into a plurality of regions defined according to the characteristic of the component and distinguishes the divided regions with labels (S44). For example, the components such as the undercover have paint markings on a part for the assembly work, and they may be a divided into a body label (Label 1), a paint marking label (Label 2), and a bolt color label (Label 3) within the specific ROI of the undercover, as a result, the region of the ROI may be divided into each label.

The controller 34 compares a label ratio of each area divided by the labels with each predetermined reference ratio (S45). For example, the body label, the paint marking label, and the bolt color label may exist with a predetermined ratio in the area divided by the labels. In the area divided by the labels, there may be 50% of the body label, 30% of the paint marking label, and 20% of the bolt color label. Therefore, the controller 34 may compare each ratio of the body label (Label 1=50%), the paint marking label (Label 2=30%), and the bolt color label (Label 3=20%) and each reference ratio in the area divided by the labels. By comparing the ratios, it may determine whether there is a defect through the deviation of the label ratio and the reference ratio.

In addition, the controller 34 compares each label ratio in the area divided by the labels with each other (S46). For example, by comparing the ratio of the body label (Label 1=50%) and the ratio of the bolt color label (Label 3=20%) in the area divided by the labels with each other, it may be determined whether there is a defect from the ratio changed when the engagement component is missing.

In addition, the controller 34 may compare vector components (a size and a direction) of the pixels in the area predetermined for each angle with a reference value through a histogram of gradient (HOG) algorithm to determine that it is less than a predetermined value as the defect (S47).

Again referring to FIG. 5, the controller 34 displays a vehicle underbody inspection result (OK) on the screen if it is determined as OK without any defects after performing the first vision inspection analysis as above (S5; Yes) (S6). Then, the controller 34 converts and the inspection result data in the DB (S10). At this time, if the vehicle is determined to be normal in the first vision inspection analysis, the controller 34 terminates the inspection without performing a secondary deep-learning inspection, which is described later.

This is because it takes a lot of computational load and a lot of time to perform the secondary deep-learning inspection for all vehicles due to the cycle time in the process in which the first vision inspection result is output within a few seconds after the vehicle passes the vision system 20.

On the other hand, when the vehicle enters a repair process due to poor assembly, since it is usually unloaded from the hanger and a worker has to perform a re-inspection by lifting it up again for the underbody inspection of the vehicle, there is a drawback that the work is cumbersome and a lot of labor is performed.

Therefore, the controller 34 according to an exemplary embodiment of the present disclosure does not immediately send the vehicle determined to be defective in the first inspection to the repair process, and performs the verification using the secondary deep-learning inspection analysis.

That is, if it is determined that the result of the first vision inspection analysis is defective (NG) (S5; No), the controller 34 performs the secondary deep-learning inspection analysis before sending the vehicle to the repair process (S7).

Here, the secondary deep-learning inspection analysis process is described in detail with reference to FIG. 6 to FIG. 8.

Figure 8:
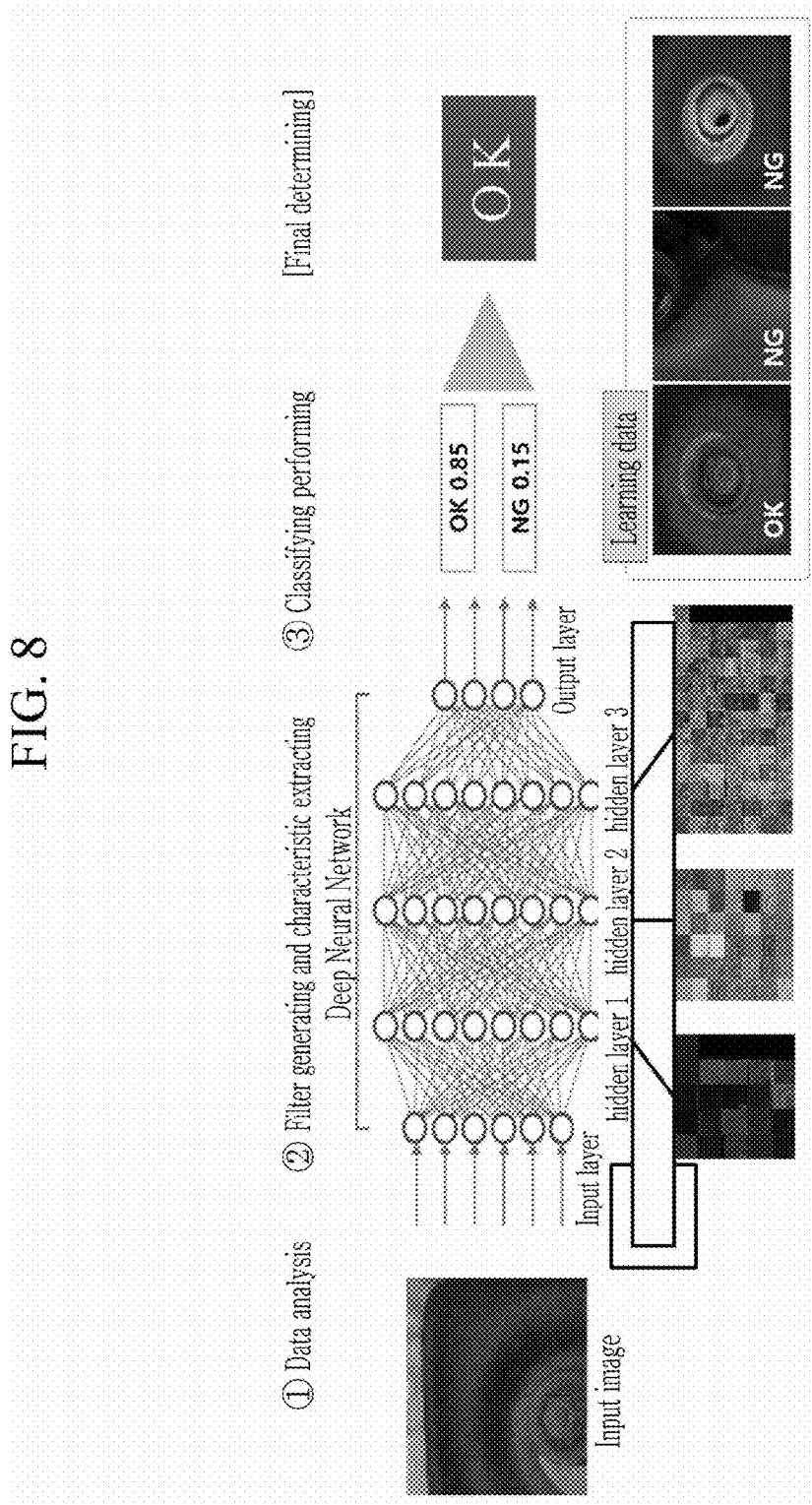
FIG. 8 is a schematic view showing a second deep-learning inspection analysis method according to an exemplary embodiment of the present disclosure.

FIG. 8 is a schematic view showing a second deep-learning inspection analysis method according to an exemplary embodiment of the present disclosure.

Referring to FIG. 6 and FIG. 8, the controller 34 transmits the image determined as the defect to a deep-learning engine 34a (S71), and operates the deep-learning engine 34a suitable for the corresponding component by using the image as the input information (S72).

The deep-learning engine 34a separates the input image into a separate learning image of a predetermined size (e.g., a size of 1.5 times) compared to the ROI. At this time, the deep-learning engine 34a analyzes the image by using convolutional neural networks (CNN), but may perform a convolution operation by applying a filter of a 3*3 size to the input image.

The deep-learning engine 34a performs the learning after labeling the normal component and the component with the defect. In this case, the deep-learning engine 34a may learn the image of the similar background as the defective because the amount of the defective images is limited compared to the normal (determining defects with or without the component).

This deep-learning engine 34a uses a technique to discriminate between normal and defective according to the presence/absence of the defect rather than detecting the defective component. That is, only the image determined as defective in a rule-based algorithm of the first vision inspection analysis is determined whether there is additional defect.

Again referring to FIG. 5, if the result of the secondary deep-learning inspection analysis as above is determined as normal (OK) (S8; Yes), the controller 34 displays the final vehicle underbody inspection result (OK) determined as normal on the screen (S6). Then, the controller 34 stores the inspection result data as the DB (S10).

On the other hand, if the result of the secondary deep-learning inspection analysis is determined to be defective, the controller 34 may display the underbody of the vehicle inspection result (NG) determined as the final defect on the screen and may alarm it to the worker (S9). Then, the controller 34 stores the inspection result data into the DB (S10).

Figure 9:
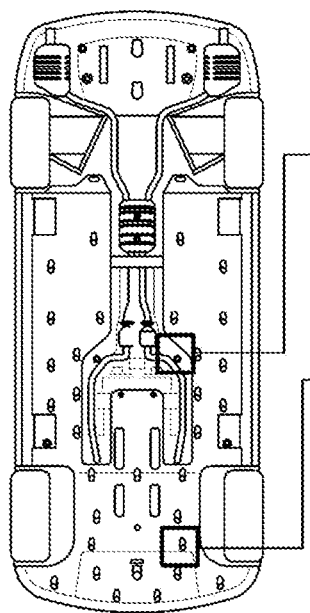
FIG. 9 is a view schematically showing inspection result data NG according to an exemplary embodiment of the present disclosure.

FIG. 9 is a view schematically showing an inspection result data NG according to an exemplary embodiment of the present disclosure.

Referring to FIG. 9, the controller 34 according to an exemplary embodiment of the present disclosure graphically displays the vehicle ID and the defect occurrence position of the underbody of the vehicle based on the vehicle underbody inspection result and generates the data that the corresponding part, the position, the component item, the inspection time, and the image have been saved.

The controller 34 accumulates the generated inspection result data in the DB 33 and stores it in a DB to secure the quality management according to statistics, and may be used as a basis for correcting the assembly defect causes and the assembly defect processes in the process in which the occurrence frequency of the defects is frequent in the future.

As described above, according to an exemplary embodiment of the present disclosure, there is an effect that may prevent musculoskeletal diseases and human errors according to the conventional worker naked eye inspection by inspecting the underbody of the vehicle through the vision system of various photographing angles.

In addition, by determining whether the defects are generated based on objective and quantitative data based on the accurate setting of the vision system suitable for the various vehicle types/specifications and the deep-learning data, there is an effect of improving the reliability of the inspection and reducing a claim cost of the field.

In addition, it is possible to predict the assembly problem at the time by storing the image-based underbody inspection result of the vehicle into a database, and it may be expected to improve an assembly quality and a production number in the factory by using it as a basis for correcting the assembly defect cause and the assembly defect process in the process with frequent defect occurrence.

Although an exemplary embodiment has been described above, the present disclosure is not limited thereto, and various other modifications are possible.

For example, in the above-described exemplary embodiment of the present disclosure, it has been described that the fixed vision system 20 is mounted on the hanger to photograph the underbody of the moving vehicle, but the present disclosure is not limited thereto, and the vision system 20 may photograph while moving.

Figure 10:
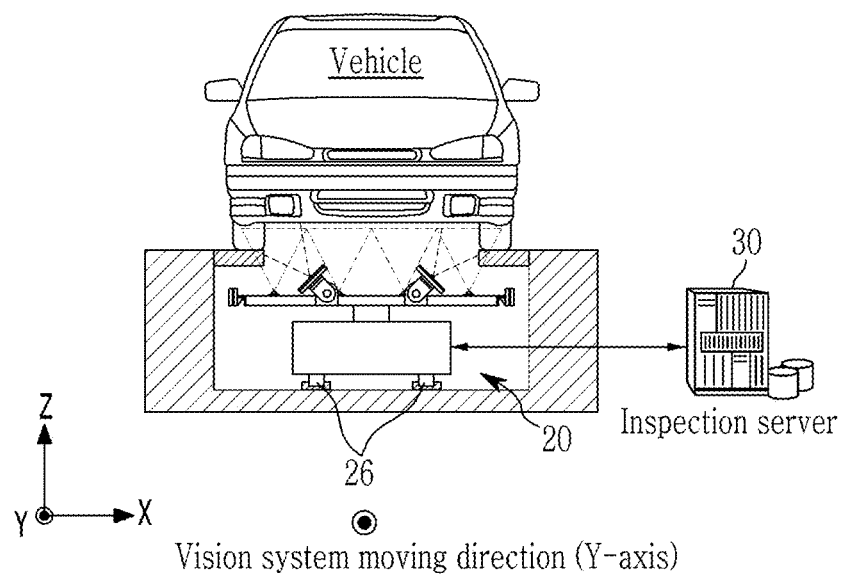
FIG. 10 and FIG. 11 are views showing a configuration of an inspection system for a vehicle underbody according to an additional exemplary embodiment of the present disclosure.
Figure 11:
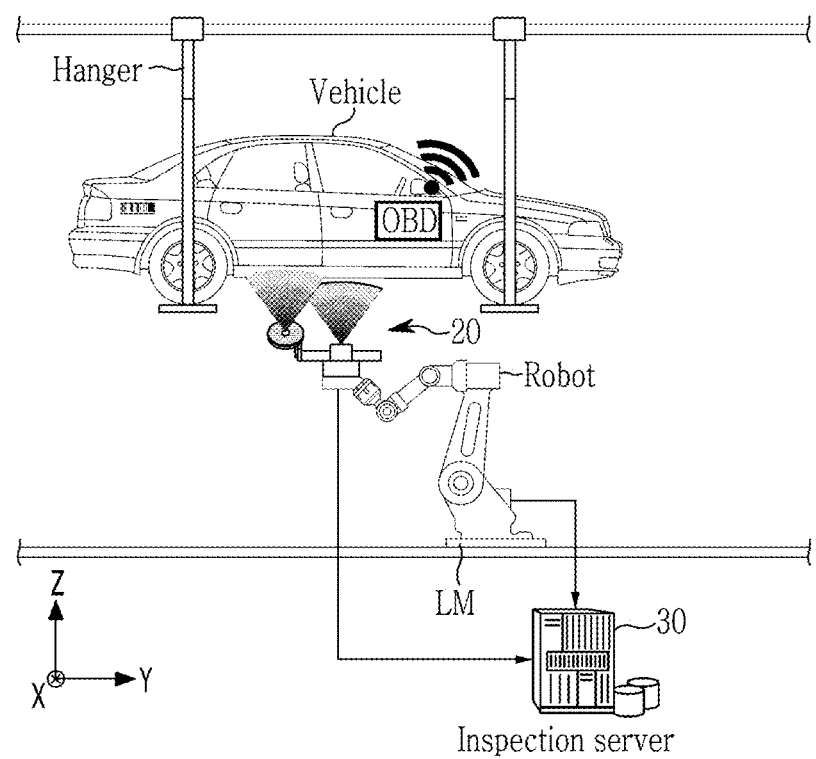

FIG. 10 and FIG. 11 are views showing a configuration of an inspection system for a vehicle underbody according to an additional exemplary embodiment of the present disclosure.

First, referring to FIG. 10, in the above-described exemplary embodiment, the process in which the vehicle is mounted on the hanger and moved is mainly described, but the inspection may be performed while the vehicle is stopped at a predetermined inspection position according to various process methods.

Accordingly, the vision system 20 may photograph the entire area of the underbody of the vehicle while the vision system 20 moves in a space beneath the stopped vehicle in the direction of Y-axis through a front/rear moving device 27 of a linear motion (LM) guide type installed at the bottom.

Also, referring to FIG. 11, the vision system 20 is mounted on an end effector of a multi joint robot and may take photographs of the underbody of the vehicle while moving through a kinematic posture control of a robot, or the front/rear moving device 27 may be provided at the bottom of the robot to take photographs while moving.

According to the present disclosure, there is an advantage of being able to implement the inspection system for the vehicle underbody adapted to various environmental conditions of an in-line process.

The embodiment of the present disclosure described above is not implemented only by the method and apparatus, but it may be implemented by a program for executing the functions corresponding to the configuration of the exemplary embodiment of the present disclosure or a recording medium having the program recorded thereon. These implementations can be realized by the ordinarily skilled person in the art from the description of the above-described exemplary embodiments.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. An inspection system for a vehicle underbody of an in-line process, comprising:
    a vehicle recognition unit for acquiring a vehicle ID by recognizing a vehicle entering an inspection process;
    a vision system that photographs the vehicle underbody through a plurality of cameras disposed under a vehicle moving direction (Y-axis) and disposed at vertical and diagonal angles along a width direction (X-axis) of the vehicle; and
    an inspection server that detects assembly defects of a component by performing at least one of a first vision inspection that matches an object image for each component through a rule-based algorithm or a secondary deep-learning inspection through a deep-learning engine by acquiring a vehicle underbody image photographed by operating the vision system with setting information suitable for a vehicle type and a specification according to the vehicle ID,
    wherein the inspection server includes:

a communication unit including at least one wire/wireless communication device for communication with the vehicle recognition unit and the vision system;
an image processing unit distinguishing and storing the vehicle underbody image captured at a same time point for each ID of the vertical camera and each of the tilting cameras;
a database (DB) storing various programs and data for the vehicle underbody inspection and storing DB-formed data by matching the inspection result data by each vehicle ID with a corresponding image; and
a controller analyzing the vehicle underbody image to detect an assembly state and a defect of the component, but omitting secondary deep-learning inspection for the vehicles in which a first vision inspection result is normal and performing the secondary deep-learning inspection only for vehicles with a poor first vision inspection result,
wherein the image processing unit generates a single vehicle underbody image by matching the images captured by a plurality of cameras ID, adjusts noise and brightness through a pre-processing work of the vehicle underbody image, and removes a background to extract a region of interest (ROI) for each component, and
wherein the controller divides the region of interest into a plurality of regions defined according to a characteristic of the component, distinguishes the divided regions with a label, and compares a label ratio of each region divided by the label with a reference ratio to determine whether the component is defective in the assembly.

2. The inspection system of claim 1, wherein the vision system includes:
a plurality of vertical cameras arranged at a constant interval along the width direction on the upper surface of a base and photographing a horizontal assembly part of the vehicle underbody;
tilting cameras set on the base in diagonal directions on both sides to obtain wheel housing part images inside a tire; and
a camera controller photographing an entire region of the vehicle underbody by driving a plurality of vertical cameras and the tilting cameras according to an operation instruction of the inspection server and transmitting the photographed vehicle underbody image to the inspection server.

3. The inspection system of claim 1, wherein the plurality of cameras are applied with an area scan camera type for correction of an inspection cycle time and an inspection position for each frame.

4. The inspection system of claim 1, wherein the plurality of cameras are applied as a global shutter type to photograph the vehicle underbody.

5. The inspection system of claim 1, wherein the vision system includes an LED plate light configured on an upper surface of the base and an LED ring light configured on an installation surface of each of the tilting cameras, and each light filters a diffuse reflection through a polarizing filter.

6. The inspection system of claim 1, wherein the vision system adjusts a tilting angle (.theta.) of each of the tilting cameras through a tilting camera mounting unit that includes at least one servo motor and changes setting positions in up/down and left/right directions.

7. The inspection system of claim 6, wherein the vision system further includes a vertical elevator for vertically changing a position of the base on which the plurality of cameras are disposed.

8. The inspection system of claim 1, wherein the vision system is installed so as to move back and forth according to an equipment environment through a front and rear moving device of a linear motion (LM) guide type installed at the lower part.

9. The inspection system of claim 1, wherein the inspection server includes:
a communication unit including at least one wire/wireless communication device for communication with the vehicle recognition unit and the vision system;
an image processing unit distinguishing and storing the vehicle underbody image captured at a same time point for each ID of the vertical camera and each of the tilting cameras;
a database (DB) storing various programs and data for the vehicle underbody inspection and storing DB-formed data by matching the inspection result data by each vehicle ID with a corresponding image; and
a controller analyzing the vehicle underbody image to detect an assembly state and a defect of the component, but omitting secondary deep-learning inspection for the vehicles in which a first vision inspection result is normal and performing the secondary deep-learning inspection only for vehicles with a poor first vision inspection result.

10. The inspection system of claim 1, wherein the controller converts the object image to a grayscale, compares an area feature value for each angle through template matching, extracts a matching score according to the comparison, and determines that it is defective if the matching score is less than a predetermined reference value.

11. The inspection system of claim 10, wherein the controller divides the region of interest into a plurality of regions defined according to a characteristic of the component, distinguishes the divided regions with a label, and compares a label ratio of each region divided by the label with a reference ratio to determine whether the component is defective in the assembly, and the controller compares label ratios in the region divided by the label with each other to determine whether the component is defective in the assembly from a ratio that changes when any one label ratio is omitted.

12. An inspection system for a vehicle underbody of an in-line process, comprising:
a vehicle recognition unit for acquiring a vehicle ID by recognizing a vehicle entering an inspection process;
a vision system that photographs the vehicle underbody through a plurality of cameras disposed under a vehicle moving direction (Y-axis) and disposed at vertical and diagonal angles along a width direction (X-axis) of the vehicle; and
an inspection server that detects assembly defects of a component by performing at least one of a first vision inspection that matches an object image for each component through a rule-based algorithm or a secondary deep-learning inspection through a deep-learning engine by acquiring a vehicle underbody image photographed by operating the vision system with setting information suitable for a vehicle type and a specification according to the vehicle ID,
wherein the inspection server includes:
a communication unit including at least one wire/wireless communication device for communication with the vehicle recognition unit and the vision system;

an image processing unit distinguishing and storing the vehicle underbody image captured at a same time point for each ID of the vertical camera and each of the tilting cameras;

a database (DB) storing various programs and data for the vehicle underbody inspection and storing DB-formed data by matching the inspection result data by each vehicle ID with a corresponding image; and a controller analyzing the vehicle underbody image to detect an assembly state and a defect of the component, but omitting secondary deep-learning inspection for the vehicles in which a first vision inspection result is normal and performing the secondary deep-learning inspection only for vehicles with a poor first vision inspection result, wherein the image processing unit generates a single vehicle underbody image by matching the images captured by a plurality of cameras ID, adjusts noise and brightness through a pre-processing work of the vehicle underbody image, and removes a background to extract a region of interest (ROI) for each component, and wherein the deep-learning engine analyzes the image by using convolutional neural networks (CNN) only for the image that is defective as the first vision inspection result, and performs learning after labeling the normal component and the defective component.

13. The inspection system of claim 12, wherein the vision system includes:
a plurality of vertical cameras arranged at a constant interval along the width direction on the upper surface of a base and photographing a horizontal assembly part of the vehicle underbody;
tilting cameras set on the base in diagonal directions on both sides to obtain wheel housing part images inside a tire; and
a camera controller photographing an entire region of the vehicle underbody by driving a plurality of vertical cameras and the tilting cameras according to an operation instruction of the inspection server and transmitting the photographed vehicle underbody image to the inspection server.

14. The inspection system of claim 12, wherein the plurality of cameras are applied with an area scan camera type for correction of an inspection cycle time and an inspection position for each frame.

15. The inspection system of claim 12, wherein the plurality of cameras are applied as a global shutter type to photograph the vehicle underbody.

16. The inspection system of claim 12, wherein the vision system includes an LED plate light configured on an upper surface of the base and an LED ring light configured on an installation surface of each of the tilting cameras, and each light filters a diffuse reflection through a polarizing filter.

17. The inspection system of claim 12, wherein the vision system adjusts a tilting angle (.theta.) of each of the tilting cameras through a tilting camera mounting unit that includes at least one servo motor and changes setting positions in up/down and left/right directions.

18. The inspection system of claim 17, wherein the vision system further includes a vertical elevator for vertically changing a position of the base on which the plurality of cameras are disposed.

19. An inspection method of a vehicle underbody, comprising:
a) obtaining a vehicle ID through a barcode or a wireless communication antenna of a vehicle entering an inspection process;
b) photographing the vehicle underbody by driving a vision system disposed under a vehicle moving direction (Y-axis) and in which a plurality of cameras are disposed at vertical and diagonal angles along a width direction (X-axis) of the vehicle;
c) performing a first vision inspection of an object image for each component through a rule-based algorithm by obtaining the vehicle underbody image; and
d) omitting a secondary deep-learning inspection for the vehicle in which the first vision inspection result is normal and performing secondary deep-learning inspection for determining whether the component is defective through a deep-learning engine only for the vehicle in which the first vision inspection result shows a defect,
wherein performing the first vision inspection includes:
performing a region of interest (ROI) correction according to a vehicle position for a vehicle underbody image and performing object image recognition for each component in the vehicle underbody image and a position correction of the region of interest with an object image unit;
converting the object image to a grayscale, comparing an area feature value for each angle through template matching, and extracting a matching score according to the comparison to determine a defect if the matching score is less than a predetermined reference value;
dividing the region of interest into a plurality of regions defined according to a characteristic of a component, distinguishing the divided regions by a label and comparing a label ratio of each region divided by the label with a reference ratio, resulting in a defective assembly of the component; and
comparing each label ratio in the region divided by the label with each other and determining whether or not the component is defective in the assembly from the ratio that is changed when one label ratio is omitted.

20. The inspection method of claim 19, wherein performing of the deep-learning inspection includes:
analyzing an image using convolutional neural networks (CNN) only for an image in which the first vision inspection result defect; and
determining whether the component is defective according to presence or absence of the component in the analyzed image and determining the image with a background similar to that of the normal component as defective.

* * * * *